No. 630,721. Patented Aug. 8, 1899.
W. H. LUCAS.
COLD SAW CUTTING OFF MACHINE.
(Application filed Oct. 14, 1898.)
(No Model.) 2 Sheets—Sheet 1.
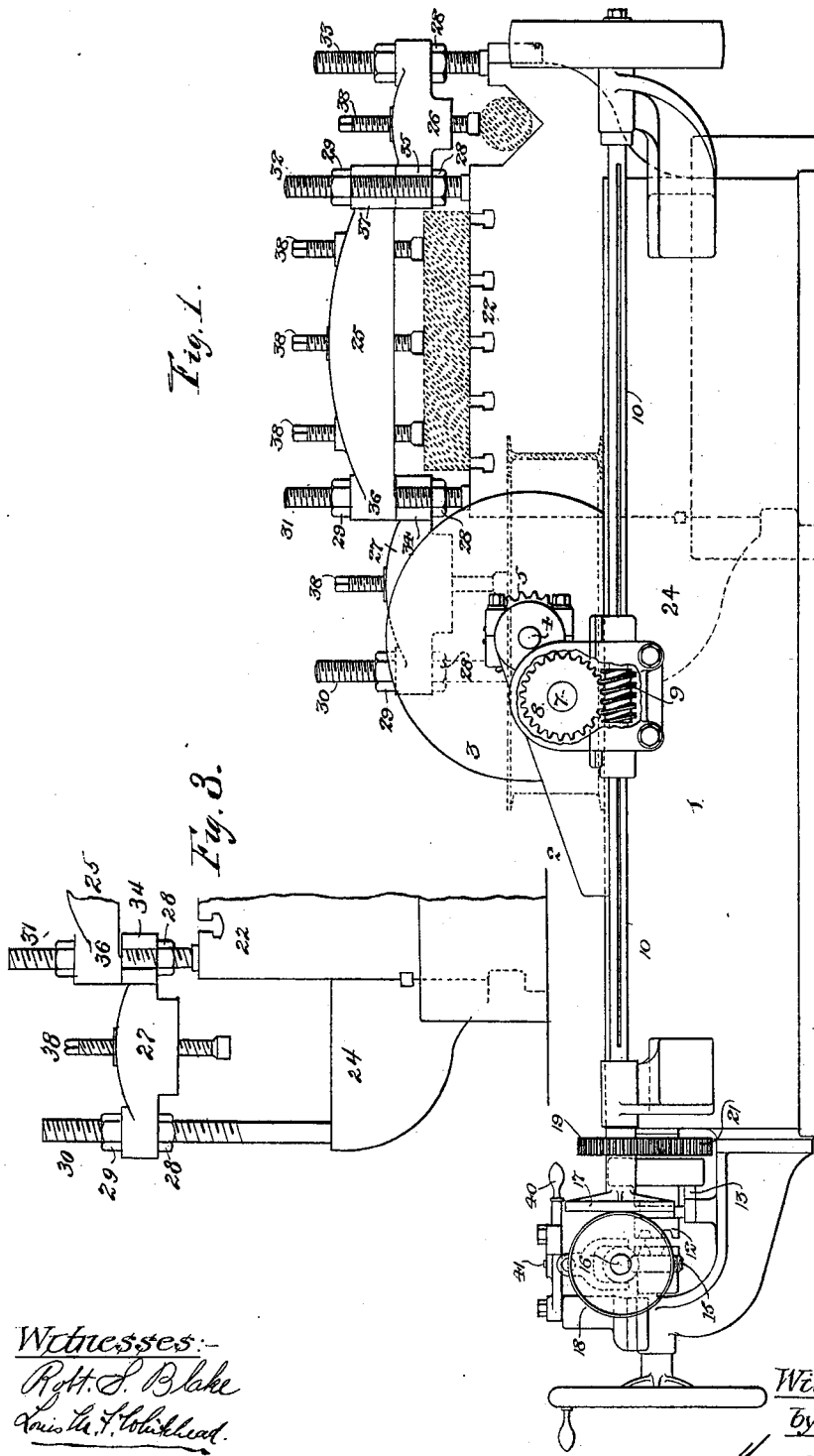
Witnesses:
R. H. S. Blake
Louis W. F. Holdhead
Inventor:
William H. Lucas.
by his Attorneys
Howson & Howson No. 630,721. Patented Aug. 8, 1899.
W. H. LUCAS.
COLD SAW CUTTING OFF MACHINE.
(Application filed Oct. 14, 1898.)
(No Model.) 2 Sheets—Sheet 2.
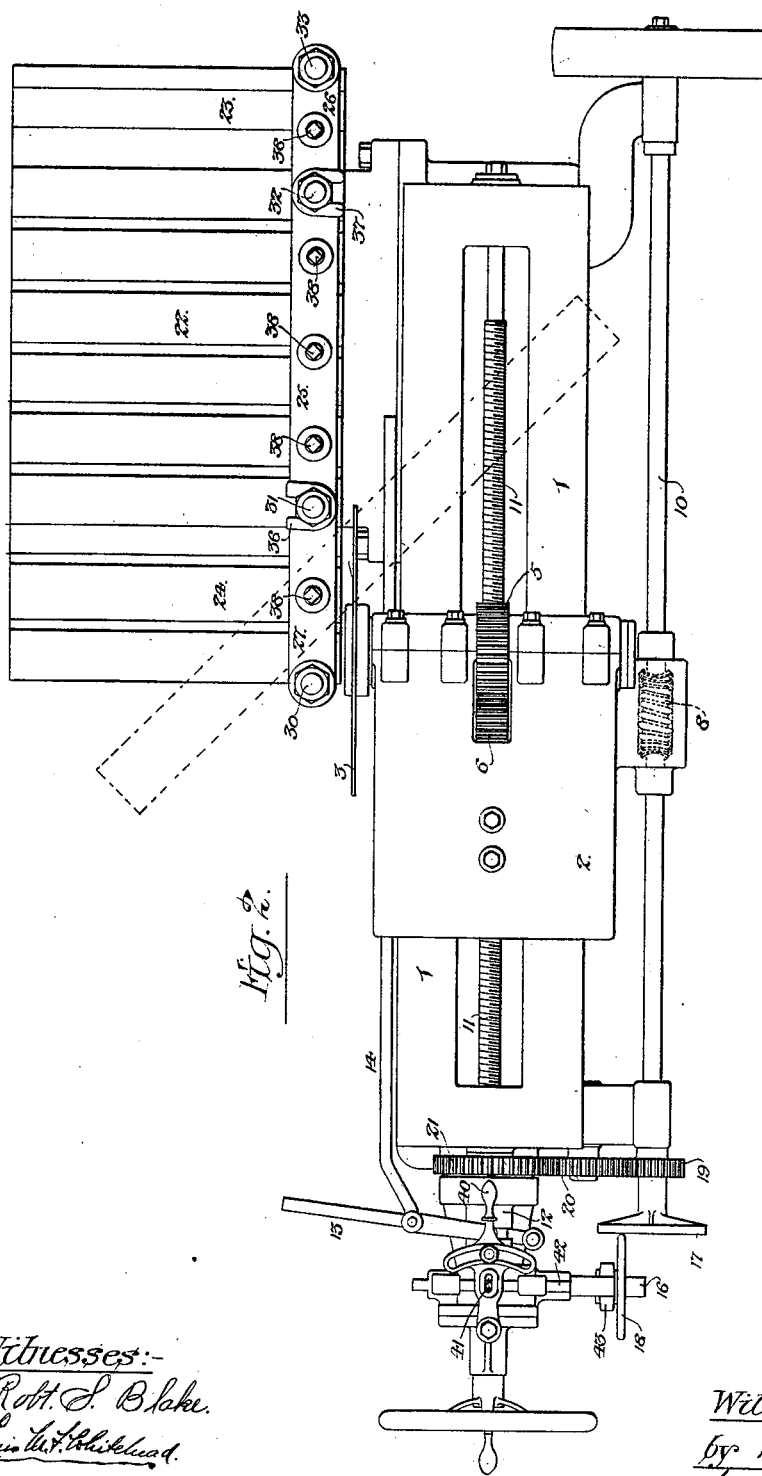
Witnesses:—
Robt. S. Blake.
Louis M. F. Whitehead.
Inventor:—
William H. Lucas.
by his Attorneys.
Howson Howson

UNITED STATES PATENT OFFICE.

WILLIAM H. LUCAS, OF PHILADELPHIA, PENNSYLVANIA, ASSIGNOR TO HIMSELF, FREDERICK H. GLIEM, AND JOHN P. MATHIEU, OF SAME PLACE.

COLD-SAW CUTTING-OFF MACHINE.

SPECIFICATION forming part of Letters Patent No. 630,721, dated August 8, 1899.

Application filed October 14, 1898. Serial No. 693,521. (No model.)

*To all whom it may concern:*

Be it known that I, WILLIAM H. LUCAS, a citizen of the United States, residing in Philadelphia, Pennsylvania, have invented certain Improvements in Cold-Saw Cutting-Off Machines, of which the following is a specification.

One object of my invention is to so construct a cold-saw cutting-off machine that it is adapted for acting upon either plates, shafts, beams, or "shapes" and can cut said beam or shape at any desired point in its length, a further object being to apply power to the feed-screw more effectively than usual during the forward movement of the saw-carriage when the saw is making its cut. These objects I attain in the manner hereinafter set forth, reference being had to the accompanying drawings, in which—

Figure 1 is a front view of a cold-saw cutting-off machine constructed in accordance with my invention. Fig. 2 is a plan view of the same, and Fig. 3 is a front view showing the beam-supporting table or shelf and clamp.

1 represents the fixed bed of the machine, which constitutes a guide for the saw-carriage 2, the saw 3, which may be either toothed or plain, being mounted upon a spindle 4, which is driven by means of spur-gears 5 and 6 from a parallel spindle 7, the latter having a worm-wheel 8, which meshes with a worm 9 on the driving-shaft 10 at the front of the machine, this worm being mounted in a box on the carriage 2 and being free to travel along the driving-shaft as said carriage is reciprocated. The feed-screw 11 of the carriage 2 is operated by a clutch 12, which is under control of a lever 13, having a rod 14 projecting alongside of the bed 1 and adapted to be struck by a projection on the carriage 2, so as to throw the clutch out of operation when the carriage reaches the limit of its movement in either direction, the clutch being driven at slow speed during the forward or cutting movement of the carriage and at higher speed during the return movement. The slow-speed movement is derived from a worm-wheel 15, which meshes with a worm on a transverse shaft 16, driven from the shaft 10 by means of friction-disks 17 and 18, the quick or return movement being imparted to the clutch 12 by means of spur-gears 19, 20, and 21, the gear 19 being secured to the shaft 10 and the gear 21 having a hub adapted to engage with a friction-cup which forms part of the clutch. All of these parts are substantially similar to those used in cold-saw cutting-off machines of ordinary construction, the novel features of my invention comprising the means for mounting and operating the friction-disk 18 and the special construction and disposition in respect to the saw of the parts of the work-supporting table or bed. The latter comprises three parts—namely, the flat bed 22 for receiving sheets or plates, the V-shaped groove or recess 23 for receiving shafts or rods, and the depressed table or shelf 24 for receiving beams or other shapes, said table or shelf 24 being disposed on the "near" side of the flat bed 22—that is to say, the side which the saw first approaches in its forward cutting movement.

The flat table or bed 22 is provided with a clamping-yoke 25, the grooved work-holder 23 with a clamping-yoke 26, and the table or shelf 24 with a clamping-yoke 27, these yokes being under control of nuts 28 and 29 on screws 30, 31, 32, and 33, projecting upwardly from the fixed structure of the machine, and in order that either clamping-yoke may be operated independently of the others the yoke 27 is hung to the screw 30 and has an open jaw 34 for embracing the screw 31. The yoke 26 is hung to the screw 33 and has an open jaw 35 for embracing the screw 32, and the yoke 25 has at one end an open jaw 36, embracing the screw 31, and at the other end a similar but oppositely-facing open jaw 37, embracing the screw 32. By reason of this construction, therefore, the yokes 26 and 27 can be thrown out of engagement with the screws 31 and 32 when it is desired to operate the yoke 25, and the latter can be thrown out of engagement with the screw 31 when it is desired to operate the yoke 27 or out of engagement with the screw 32 when it is desired to operate the yoke 26. The yokes are also provided, by preference, with adjustable clamp-screws 38, as shown.

By locating the beam-supporting table or shelf 24 on the near side of the table or bed 22 a beam can be disposed on said table or shelf 24 at any desired angle, as shown, for instance, by dotted lines in Fig. 2, and can therefore be cut off at any desired angle in respect to the longitudinal line of the beam and at any desired point in its length, and in this respect my invention is an improvement upon that class of machines which have been proposed and in which the beam-supporting table or shelf was at the far side of the flat bed 22, for in the latter case the beam had to be disposed at an angle the reverse of that shown in Fig. 2, and hence could not be cut at an angle at a point remote from either end, as the projecting portion of the beam in such case came into contact with the saw-carriage before the completion of the cut. Therefore in operating this class of machines it became necessary to make two cuts—first, a cut directly across the beam, so as to reduce the length of the same to the desired extent, and then an angular cut on the slightly-projecting end of the beam, thus involving not only waste of time, but loss of material.

The periphery of the friction-disk 18 bears agianst the flat face of the friction-disk 17 on the driving-shaft 10. Hence by moving said friction-disk 18 to and fro across the face of the disk 17 the speed of the work-shaft 16 may be increased or diminished, or said shaft may be stopped altogether by adjusting the disk 18 so that it coincides with the axis of the disk 17. Such movement of the disk 18 and shaft 16 is effected by means of a lever 40, hung to a suitable stud on the fixed frame of the machine and slotted for engagement with a pin 41 on a rod 42, which is guided in suitable fixed bearings and has a fork 43 engaging with the grooved hub of the disk 18, as shown in Fig. 2. By reason of this construction change of speed and power is effected by movement of the driven disk in a direction parallel with its shaft, this being a more effective plan than that which has hitherto been adopted, which involves the movement of the driven disk in a direction at right angles to the axis of its shaft.

Having thus described my invention, I claim and desire to secure by Letters Patent—

1. The combination in a cold-saw cutting-off machine, of the traveling saw-carriage, with a work-table having a flat bed and a beam-supporting table or shelf on the near side of said table or bed and below the work-table, substantially as specified.

2. The combination in a cold-saw cutting-off machine, of the traveling saw-carriage with a work-table or bed comprising a flat portion, a beam-receiving table or bench on the near side of and below the same, and a shaft-receiving groove on the far side, substantially as specified.

3. The combination of the work-table or bed comprising a flat table flanked by a beam-receiving table or shelf, and a shaft-receiving groove, the upright clamp-screws, a central clamping-yoke having notched jaws at each end for engagement with said clamping-screws, and outer clamp-yokes pivoted at their outer ends to the outer clamp-screws and having at their inner ends notched jaws for engagement with the inner clamp-screws, substantially as specified.

4. The combination in a cold-saw cutting-off machine, of the feed-screw, the driving-shaft having a driving friction-disk at the end, a transverse shaft having a driven friction-disk with peripheral bearing upon the face of the driving friction-disk, means for moving said shaft in a direction parallel with its axis, and gearing whereby said shaft is caused to operate the feed-screw, substantially as specified.

5. The combination in a cold-saw cutting-off machine, of the feed-screw, the driving-shaft having a driving friction-disk at the end, a driven friction-disk having peripheral bearing upon the face of said driving friction-disk, and mounted upon a shaft movable longitudinally in its bearings, a guided rod having a yoke engaging with the hub of said disk, a lever for moving said rod, and gearing whereby said shaft is caused to operate the feed-screw, substantially as specified.

In testimony whereof I have signed my name to this specification in the presence of two subscribing witnesses.

WM. H. LUCAS.

Witnesses:
F. E. BECHTOLD,
JOS. H. KLEIN.